United States Patent
Morioka

(10) Patent No.: US 8,824,320 B2
(45) Date of Patent: Sep. 2, 2014

(54) COMMUNICATION APPARATUS, COMMUNICATION METHOD, COMPUTER PROGRAM, AND COMMUNICATION SYSTEM

(75) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 143 days.

(21) Appl. No.: 13/202,655

(22) PCT Filed: Jan. 6, 2010

(86) PCT No.: PCT/JP2010/050053
§ 371 (c)(1),
(2), (4) Date: Aug. 22, 2011

(87) PCT Pub. No.: WO2010/100956
PCT Pub. Date: Sep. 10, 2010

(65) Prior Publication Data
US 2011/0305162 A1    Dec. 15, 2011

(30) Foreign Application Priority Data

Mar. 5, 2009    (JP) ................................ P2009-051566

(51) Int. Cl.
*H04J 3/14* (2006.01)
*H04W 16/28* (2009.01)

(52) U.S. Cl.
CPC ..................................... *H04W 16/28* (2013.01)
USPC ....................................................... 370/252

(58) Field of Classification Search
CPC ... G06F 13/364; G06F 13/374; H04B 7/0897;
H04L 12/403; H04L 12/413; H04L 12/2801;
H04L 12/44; H04L 47/10; H04L 43/50;
H04L 43/0852; H04L 43/00; H04W 28/04;
H04W 84/12; H04W 24/08; H04W 28/08;
H04W 74/08; H04W 74/0816; H04W 16/28;
H04W 28/24
USPC .......................................................... 370/252
See application file for complete search history.

(56) References Cited

U.S. PATENT DOCUMENTS 7,075,902 B2 * 7/2006 El Batt ........................... 370/310
7,321,580 B1 * 1/2008 Ramanathan et al. ......... 370/339

(Continued)

FOREIGN PATENT DOCUMENTS

| JP | 3544891 | 4/2004 | |
|---|---|---|---|
| JP | 2005-86524 | 3/2005 | |
| JP | 2005086524 A * | 3/2005 | .............. H04L 12/28 |

OTHER PUBLICATIONS

International Search Report from the Japanese Patent Office in International Application No. PCT/JP2010/050053, mailed Mar. 9, 2010.

*Primary Examiner* — Yong Zhou
(74) *Attorney, Agent, or Firm* — Sony Corporation

(57) ABSTRACT

While directional communication using millimeter waves is realized, the number of communication stations through which simultaneous communication is possible is increased to increase the throughput of the entire system.
Beamforming of a transmission beam is performed not only on a data frame, but also on a CTS frame. In a case where the transmission/reception beam of a hidden terminal (STA_C) is in a direction different from that of a data transmission side (STA_A) with respect to a data receiving side (STA_B), the hidden terminal (STA_C) ceases to receive a CTS. Consequently, a transmission stop period is not set, and a communication operation with a communication party terminal (STA_D) thereof can be continued.

20 Claims, 10 Drawing Sheets

(56) References Cited

U.S. PATENT DOCUMENTS

| | | |
|---|---|---|
| 8,553,659 B2 * | 10/2013 | Nandagopalan et al. ..... 370/338 |
| 2003/0152086 A1 * | 8/2003 | El Batt .......................... 370/400 |
| 2005/0169232 A1 * | 8/2005 | Sakoda et al. ................. 370/347 |
| 2006/0209772 A1 * | 9/2006 | Fang et al. .................... 370/338 |
| 2007/0232235 A1 * | 10/2007 | Li et al. ......................... 455/63.1 |
| 2008/0009306 A1 * | 1/2008 | Suga et al. .................... 455/522 |

* cited by examiner

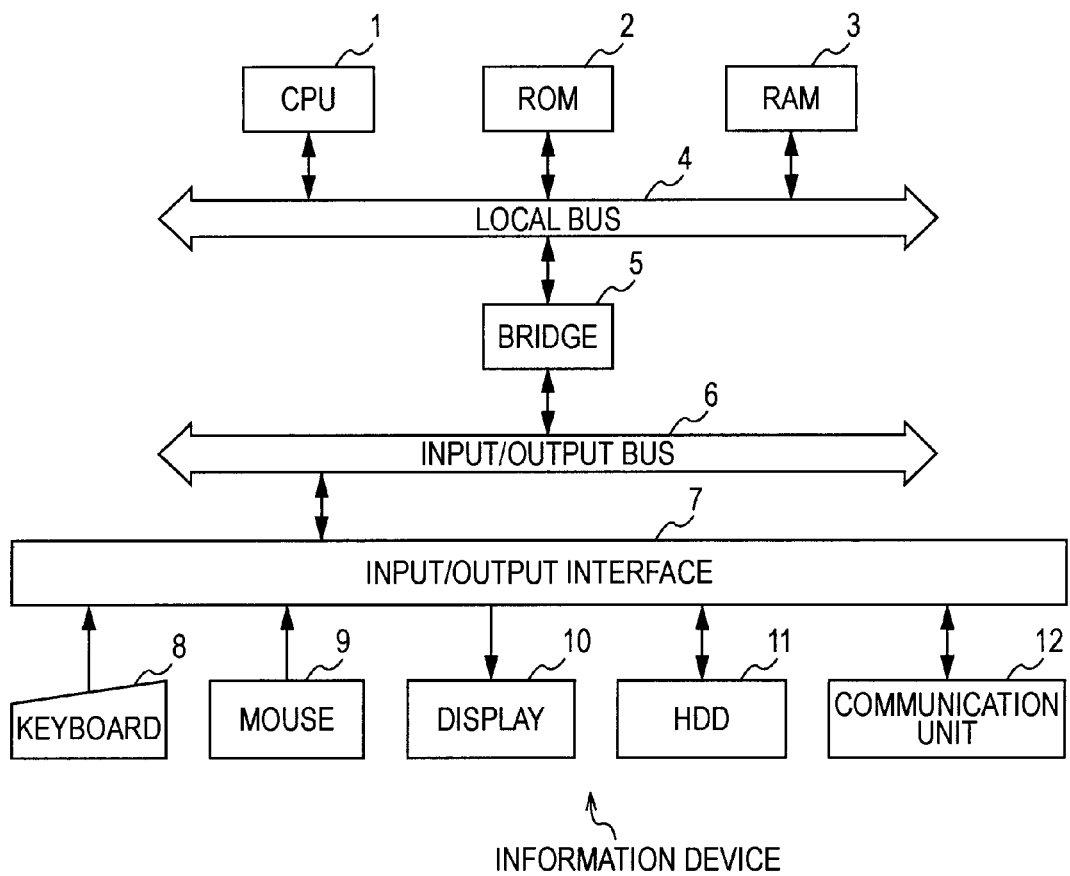

COMMUNICATION APPARATUS, COMMUNICATION METHOD, COMPUTER PROGRAM, AND COMMUNICATION SYSTEM

TECHNICAL FIELD

The present invention relates to a communication apparatus, a communication method, a computer program, and a communication system that perform wireless communication by using, for example, millimeter waves and, more particularly, relates to a communication apparatus, a communication method, a computer program, and a communication system that extend the communication distance of millimeter waves and that direct a beam of a directional antenna toward the position of a communication party.

BACKGROUND ART

Wireless communication called "millimeter wave" communication can realize higher communication speed by using a high-frequency electromagnetic wave. Examples of the main applications of millimeter-wave communication include wireless access communication for a short distance, an image transmission system, simplified wireless communication, and automobile collision prevention radars. Furthermore, at present, technology development for millimeter-wave communication, which is directed toward use promotion, such as realization of large capacity and long distance transmission, size reduction of wireless apparatuses, and reduced cost, has been performed. Here, the wavelength of a millimeter wave corresponds to 10 mm to 1 mm, and the frequency corresponds to 30 GHz to 300 GHz. For example, in wireless communication using a 60 GHz band, since channel assignment is possible in GHz units, very high-speed data communication can be performed.

A millimeter wave has a shorter wavelength and a stronger property of rectilinear propagation compared to microwaves that have become widely popular in a wireless LAN (Local Area Network) technology or the like, and can transmit a very large amount of information. On the other hand, since the attenuation of a millimeter wave as resulting from reflection is intense, for a wireless path for performing communication, a direct wave, and a wave reflected approximately one time at most are mainly used. Furthermore, since the propagation loss of a millimeter wave is large, a millimeter wave has a property such that a radio signal does not reach far places.

In order to compensate for such a travel distance problem of a millimeter wave, a method is considered in which an antenna of a transmitter/receiver is made to have directivity, a transmission beam and a reception beam thereof are directed in a direction in which a communication party is positioned, and a communication distance is extended. The directivity of a beam can be controlled by, for example, providing each of transmitters/receivers with a plurality of antennas, and by changing the transmission weight or the reception weight for each antenna. In millimeter waves, since reflected waves are hardly used, and a direct wave is important, beam shaped directivity is suitable, and a sharp beam is used for directivity. Then, after the optimum directivity of the antenna is learned, millimeter-wave wireless communication may be performed.

For example, a wireless transmission system has been proposed in which second communication means using communication of any one of electrical power line communication, optical communication, and sound wave communication transmits a signal for determining the directional direction of a transmission antenna, and the direction of the transmission antenna is determined, and thereafter, first communication means performs wireless transmission among transmitters/receivers using a radio wave of 10 GHz or higher (see, for example, Patent Document 1).

Furthermore, a method of extending a communication distance by using the directivity of an antenna has been used in IEEE 802.15.3c, which is a standard specification of wireless PAN (mmWPAN: millimeter-wave Wireless Personal Area Network) using a millimeter-wave band.

By the way, in wireless communication, it is known that a hidden terminal problem such that an area in which communication stations cannot directly communicate with one another exists occurs. Since negotiation cannot be made among hidden terminals, there is a probability that transmission operations will collide with one another. As a methodology for solving a hidden terminal problem, CSMA/CA (Carrier Sense Multiple Access with Collision Avoidance) based on an RTS/CTS handshake procedure is generally known, and IEEE 802.11 or the like has been widely used in wireless LAN systems.

In the RTS/CTS scheme, the communication station of the data transmission source transmits a transmission start request frame RTS (Request To Send), and starts the transmission of data frames in response to the reception of an acknowledgement frame CTS (Clear To Send) from the communication station of the data transmission destination.

Here, each of the control frames of RTS and CTS has a meaning of confirming the preparation situation for data transmission among transmitters/receivers and making hidden terminals in the surroundings not obstruct data transmission. A hidden terminal for the data transmission side (RTS transmission station) receives a CTS destined for another station and sets a transmission stop period (NAV: Network Allocation Vector). Consequently, it is possible for a data receiving side (CTS transmission station) to avoid a collision with a transmission frame by the associated hidden terminal, and can reliably receive the data frame. Furthermore, a hidden terminal for the data receiving side (CTS transmission station) receives an RTS destined for another station and sets a transmission stop period.

In the wireless PAN standard IEEE 802.15.3c (described above) using a millimeter-wave band, also, a collision avoidance procedure using an RTS/CTS handshake has been adopted. In this case, beamforming of a transmission/reception beam is used with regard to data frames, and control frames, such as RTS, CTS, and ACK, are transmitted as omni-directional frames (see FIG. 11).

However, in practice, peripheral stations that do not interfere with data frames are unnecessarily made to set a transmission stop period due to a difference in the range that a data frame and a control frame reach. As a result, the number of communication stations that can be communicated with at the same time in the system is reduced, and there is a concern that the throughput of the entire system is decreased.

As shown in FIG. 11, when a data receiving side (STA_B) receives an RTS destined for its own station from the data transmission side (STA_A), the data receiving side (STA_B) transmits an omni-directional CTS and causes a hidden terminal (STA_C) that an RTS does not reach but a CTS can reach to set a transmission stop period, thereby securing a period in which the data frame is received. It is assumed that the hidden terminal (STA_C) similarly performs the beamforming of the transmission/reception beam, and that the transmission/reception beam is directed in a direction different from that of the transmission/reception beam of the data frame. Despite the fact that the hidden terminal (STA_C) does not obstruct the data frame from a practical standpoint, the hidden terminal (STA_C) unnecessarily sets a transmission stop period as a result of the reception of the omni-directional CTS, with the result that the throughput is caused to decrease.

CITATION LIST

Patent Literature

Patent Document 1: Japanese Patent No. 3544891

DISCLOSURE OF INVENTION

Technical Problem

An object of the present invention is to provide a superior communication apparatus, a superior communication method, a superior computer program, and a superior communication system that can direct a beam of a directional antenna toward the direction in which a communication party is positioned and can extend the communication distance of millimeter waves.

Another object of the present invention is to provide a superior communication apparatus, a superior communication method, a superior computer program, and a superior communication system that can increase the number of communication stations through which simultaneous communication is possible while realizing high-speed data communication using millimeter waves by using the beamforming of a transmission/reception beam and that can increase the throughput of the entire system.

Another object of the present invention is to provide a communication apparatus, a communication method, a computer program, and a communication system that realizes high-speed data communication with directivity using millimeter waves and that can increase the number of communication stations through which simultaneous communication is possible so as to increase the throughput of the entire system while avoiding a collision by using RTS/CTS handshake.

Technical Solution

The present application has been made by considering the above-described problems. The invention as set forth in Claim 1 is a communication apparatus including:

a wireless communication unit capable of performing directional wireless communication in accordance with a communication scheme that has a plurality of beam patterns of different directions and that uses a predetermined high-frequency band; and a determination unit that determines a directional beam pattern to be used when a frame is transmitted to a communication party from among the plurality of beam patterns, wherein an acknowledgement frame is sent back to the communication party by using the directional beam pattern that is determined by the determination unit in response to a reception of a transmission start request frame destined for its own station from the communication party.

Furthermore, according to the invention as set forth in Claim 2, the communication apparatus as set forth in Claim 1 further includes a power calculation unit that calculates received electrical power when a frame that arrives from the communication party is received with each of the plurality of beam patterns, wherein the determination unit determines the directional beam pattern when a frame is transmitted to the communication party on the basis of a beam pattern at which received electrical power when the transmission start request frame is received from the communication party becomes a maximum.

Furthermore, according to the invention as set forth in Claim 3, the communication apparatus as set forth in Claim 1 is configured in such a manner that after the acknowledgement frame is sent back, a data frame from the communication party is received by using a reception beam pattern in the same direction as that of the directional beam pattern used when the acknowledgement frame was sent back.

Furthermore, the invention as set forth in Claim 4 is a communication method in a communication apparatus including a wireless communication unit capable of performing directional wireless communication in accordance with a communication scheme that has a plurality of beam patterns of different directions and that uses a predetermined high-frequency band, the communication method including:

a determination step of determining a directional beam pattern to be used when a frame is transmitted to a communication party from among the plurality of beam patterns;

a sending-back step of sending back an acknowledgement frame to the communication party by using the directional beam pattern that is determined in the determination step in response to a reception of a transmission start request frame destined for its own station from the communication party; and a reception step of receiving a data frame from the communication party.

Furthermore, the invention as set forth in Claim 5 is a computer program written in a computer-readable format for causing a communication process in a communication apparatus to be performed in a computer, the communication apparatus including a wireless communication unit capable of performing directional wireless communication in accordance with a communication scheme that has a plurality of beam patterns of different directions and that uses a predetermined high-frequency band, the computer program causing the computer to function as a determination unit that determines a directional beam pattern to be used when a frame is transmitted to a communication party from among the plurality of beam patterns;

an acknowledgement frame sending-back unit that sends back an acknowledgement frame to the communication party by using the directional beam pattern that is determined by the determination unit in response to a reception of a transmission start request frame destined for its own station from the communication party; and a data frame receiving unit that receives a data frame from the communication party.

The computer program as set forth in Claim 5 of the present application is such that a computer program written in a computer-readable format is defined so as to realize predetermined processing in a computer system. In other words, by installing the computer program as set forth in Claim 5 of the present application into the computer system, coordinated operations are exhibited in the computer system, and operational effects identical to those of the communication apparatus as set forth in Claim 1 of the present application can be obtained.

Furthermore, the invention as set forth in Claim 6 is a communication system including:

a communication apparatus that includes a wireless communication unit capable of performing directional wireless communication in accordance with a communication scheme using a predetermined high-frequency band, that transmits a transmission start request frame to a data receiving side, and that performs beamforming so that a transmission beam is directed toward the data receiving side in response to a reception of an acknowledgement frame sent back from the data receiving side so as to transmit a data frame, the communication apparatus operating as a data transmission side; and a communication apparatus that includes a wireless communication unit capable of performing directional wireless communication in accordance with a communication scheme using a predetermined high-frequency band, that performs beamforming so that a transmission beam is directed toward the data transmission side in response to a reception of the transmission start request frame destined for its own station so as to send back the acknowledgement frame, and that receives a data frame from the data transmission side, the communication apparatus operating as a data receiving side.

Note that the "system" referred to herein refers to a logical assembly of a plurality of devices (or function modules which realize specific functions), and it does not particularly matter whether or not each device and function module is within a single housing.

Advantageous Effects

According to the present invention, it is possible to provide a superior communication apparatus, a superior communication method, a superior computer program, and a superior communication system that can direct a beam of an directional antenna toward the direction in which a communication party is positioned and can extend the communication distance of millimeter waves.

Furthermore, according to the present invention, it is possible to provide a superior communication apparatus, a superior communication method, a superior computer program, and a superior communication system that realizes high-speed data communication using millimeter waves by using the beamforming of a transmission/reception beam and that can increase the number of communication stations through which simultaneous communication is possible so as to increase the throughput of the entire system.

Furthermore, according to the present invention, it is possible to provide a communication apparatus, a communication method, a computer program, and a communication system that realizes high-speed data communication with directivity using millimeter waves and that can increase the number of communication stations through which simultaneous communication is possible so as to increase the throughput of the entire system while avoiding a collision by using RTS/CTS handshake.

Furthermore, according to the inventions as set forth in Claims 1, 4, 5, and 6 of the present application, in a system in which data transmission is started as a result of the data transmission side transmitting a transmission start request frame (RTS) and the data receiving side sending back an acknowledgement frame (CTS), since the data receiving side transmits the acknowledgement frame by using a directional beam pattern, a hidden terminal that is not positioned in the orientation of the directional beam pattern does not unnecessarily set a transmission stop period. Consequently, it is possible to increase the number of communication stations through which simultaneous communication is possible, and it is possible to increase the throughput of the entire system.

Furthermore, according to the invention as set forth in Claim 2 of the present application, since the communication apparatus acting as a data receiving side determines a beam pattern in which the received electrical power when the transmission start request frame is received from the communication party becomes a maximum as a directional beam pattern that is used when an acknowledgement frame is sent back, this directional beam pattern is an optimum beam pattern for the communication party. Furthermore, since it is not necessary to cause a hidden terminal that does not obstruct the reception of a data frame for which beamforming has been performed from the communication party to set an unnecessary transmission stop period, it is possible to increase the number of communication stations through which simultaneous communication is possible, and it is possible to increase the throughput of the entire system.

Furthermore, according to the invention as set forth in Claim 3 of the present application, it is possible for the communication apparatus acting as a data receiving side to receive data frames from the communication party by using an optimum reception beam pattern in the same direction as that of the directional beam pattern that was used when the acknowledgement frame was sent back. That is, as a result of the transmission beam and the reception beam opposing each other, a more satisfactory millimeter-wave communication path is formed, and high-speed data communication can be realized.

Further objects, features, and advantages of the present invention will become apparent from the following detailed description of embodiments (to be described later) of the present invention and drawings attached thereto.

BRIEF DESCRIPTION OF DRAWINGS

FIG. 12 illustrates an example of the configuration of an information apparatus having a modularized communication apparatus 100 installed therein.

BEST MODES FOR CARRYING OUT THE INVENTION

Embodiments of the present invention will be described below in detail with reference to the drawings. Meanwhile, examples of a communication scheme for millimeter waves include a 60 GHz band used in the VHT (Very High Throughput) standard. However, the gist of the present invention is not limited to a specific frequency band.

Figure 1:
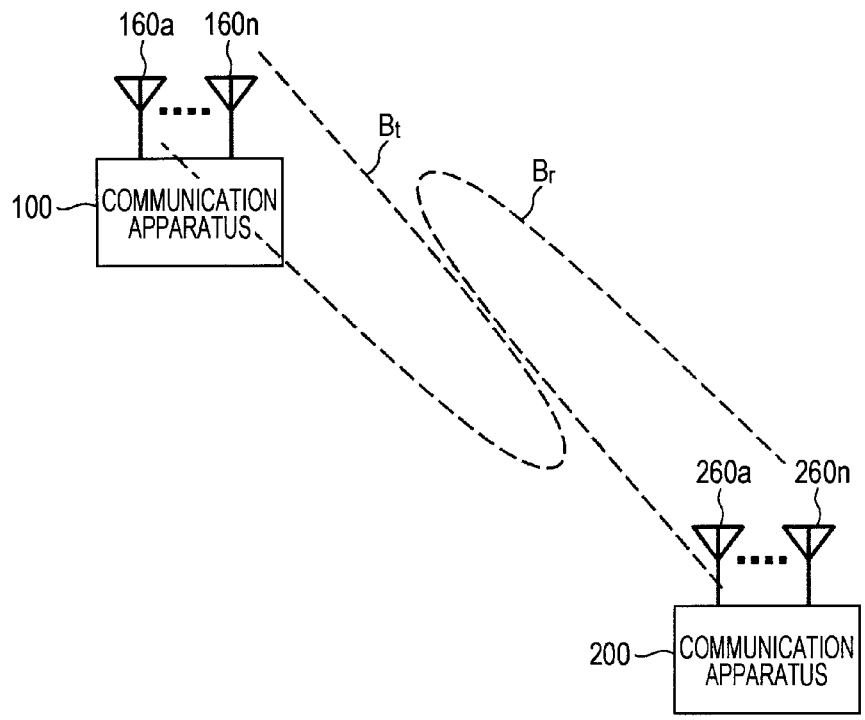
FIG. 1 schematically shows an example of the configuration of a millimeter-wave wireless communication system according to an embodiment of the present invention.

FIG. 1 schematically shows an example of the configuration of a millimeter-wave wireless communication system according to an embodiment of the present invention. The wireless communication system shown in the figure is constituted by a communication apparatus 100 and a communication apparatus 200.

It is possible for the communication apparatuses 100 and 200 to perform wireless communication with each other in accordance with a millimeter-wave communication scheme. In the millimeter-wave communication scheme, since rectilinear propagation characteristics are strong, and attenuation is large at the time of reflection, more preferably, a radio signal is received by directing a transmission beam and a reception beam toward a communication party.

In the example shown in FIG. 1, the communication apparatus 100 includes a plurality of antennas 160a to 160n for transmitting and receiving a radio signal in accordance with the millimeter-wave communication scheme. Then, by adjusting the weight of a signal that is transmitted via each of the antennas 160a to 160n, the directivity $B_t$ of a transmission beam is controlled. In the example shown in the figure, the transmission beam $B_t$ is directed in the direction of the position of the communication apparatus 200 acting as a communication party.

Furthermore, the communication apparatus 200 includes a plurality of antennas 260a to 260n for receiving a radio signal in accordance with the millimeter-wave communication scheme. Then, by adjusting the weight of the signal received via each of the antennas 260a to 260n, the directivity $B_r$ of a reception beam is controlled. In the example in the figure, the reception beam $B_r$ is directed in the direction of the position of the communication apparatus 100 acting as a communication party.

Figure 2:
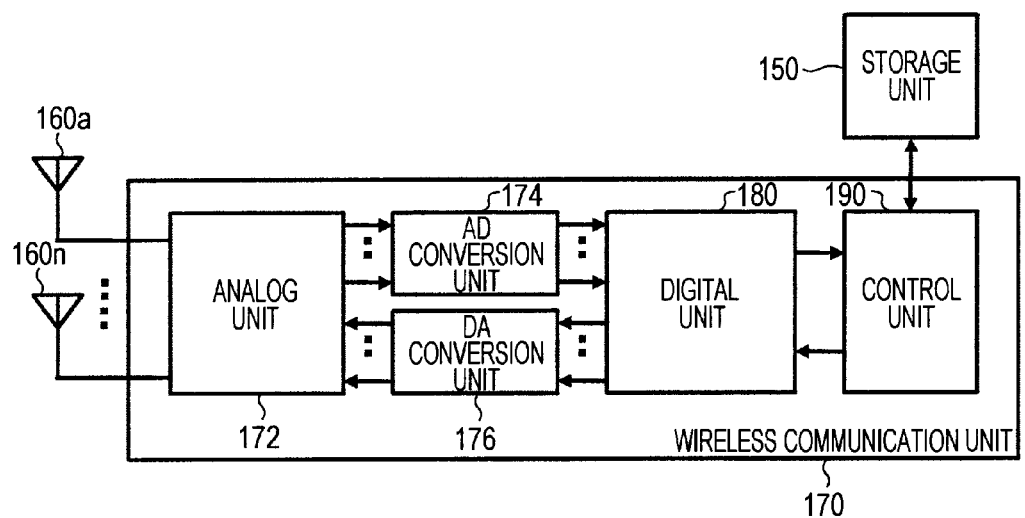
FIG. 2 illustrates an example of the configuration of a communication apparatus 100.

FIG. 2 illustrates an example of the configuration of the communication apparatus 100. The communication apparatus 100 shown in the figure may operate as a broadband router or a wireless access point. Meanwhile, although not shown in the figure, the communication apparatus 200 may also be configured in a similar manner.

The communication apparatus 100 includes a storage unit 150, the plurality of antennas 160a to 160n, and a wireless communication unit 170. The wireless communication unit 170 is constituted by an analog unit 172, an AD conversion unit 174, a DA conversion unit 176, a digital unit 180, and a control unit 190.

The plurality of antennas 160a to 160n are used for wireless communication in accordance with the millimeter-wave communication scheme. Specifically, each of the antennas 160a to 160n transmits a radio signal that has been subjected to weighting using a predetermined weight coefficient by using a millimeter wave. Furthermore, the antennas 160a to 160n receive a millimeter-wave radio signal and outputs it to the analog unit 172.

The analog unit 172 typically corresponds to an RF circuit for transmitting and receiving a radio signal in accordance with the millimeter-wave communication scheme. That is, the analog unit 172 performs low-noise amplification on the plurality of respective reception signals received by the antennas 160a to 160n and down-converts the reception signals, and outputs them to the AD conversion unit 174 at a subsequent stage. Furthermore, the analog unit 172 up-converts, into an RF band, the plurality of transmission signals that have been converted into corresponding analog signals by the DA conversion unit 176, power-amplifies the signals, and outputs them to the respective antennas 160a to 160n.

The AD conversion unit 174 converts the plurality of analog reception signals input from the analog unit 172 into corresponding digital signals, and outputs the digital signals to the digital unit 180 at a subsequent stage. Furthermore, the DA conversion unit 176 converts a plurality of digital transmission signals input from the digital unit 180 into corresponding analog signals, and outputs the analog signals to the analog unit 172.

The digital unit 180 is typically constituted by a circuit for demodulating and decoding a reception signal in accordance with the millimeter-wave communication scheme, and a circuit for coding and modulating a transmission signal in accordance with the millimeter-wave communication scheme.

Figure 3:
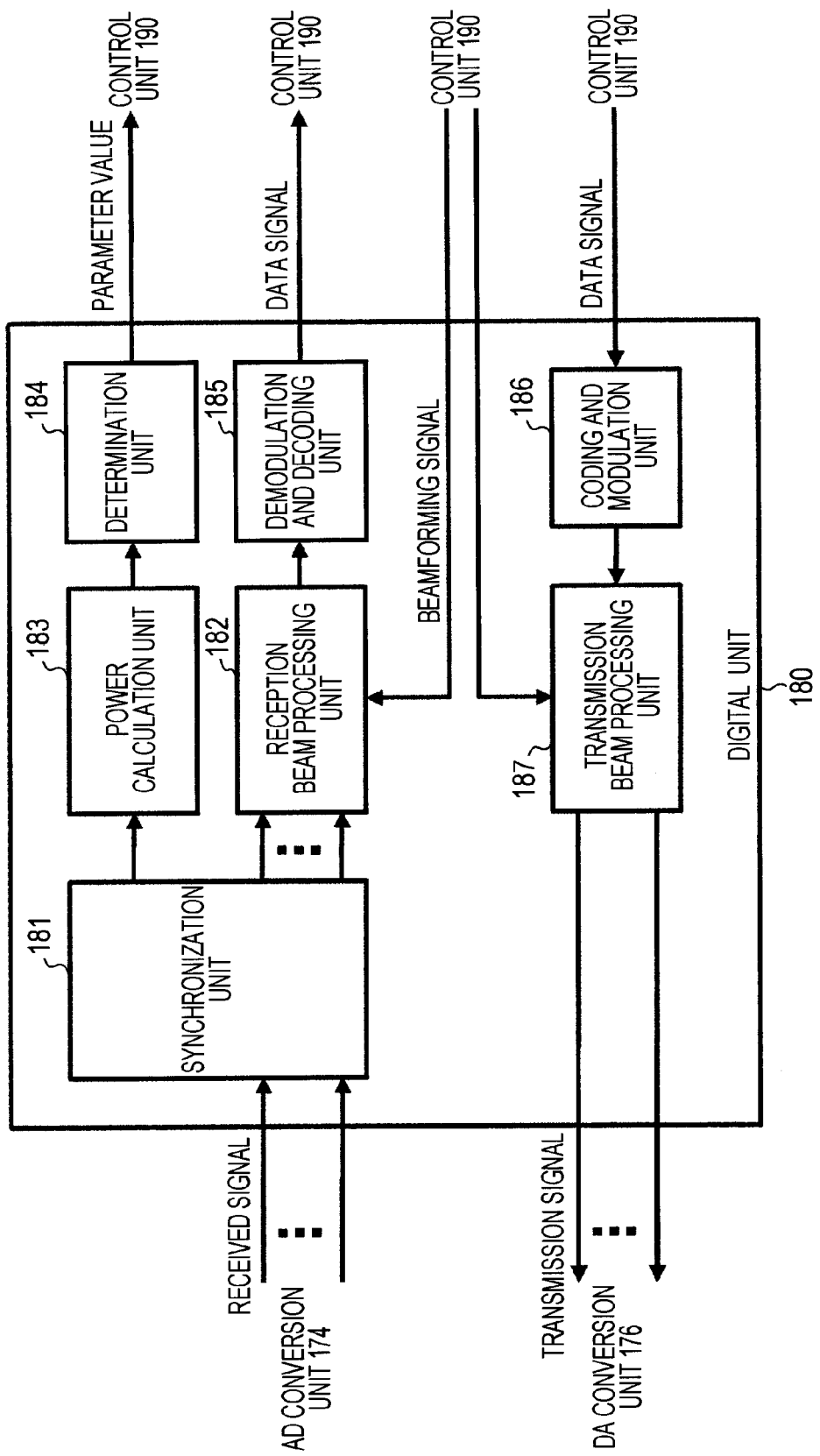
FIG. 3 illustrates an example of the internal configuration of a digital unit 180.

FIG. 3 illustrates an example of the internal configuration of the digital unit 180. As shown in the figure, the digital unit 180 is constituted by a synchronization unit 181, a reception beam processing unit 182, a power calculation unit 183, a determination unit 184, a demodulation and decoding unit 185, a coding and modulation unit 186, and a transmission beam processing unit 187.

The synchronization unit 181 synchronizes, for example, the start times of the reception processes of the plurality of reception signals that are received by the plurality of antennas 160a to 160n on the basis of the beginning preamble of a frame, and outputs the reception signals to the reception beam processing unit 182.

The reception beam processing unit 182 performs a weighting process on the plurality of reception signals input from the synchronization unit 181 in accordance with, for example, a uniform distribution or a Taylor distribution, thereby controlling the directivity of the reception beam. Then, the reception beam processing unit 182 outputs the weighted reception signal to the power calculation unit 183 and the demodulation and decoding unit 185.

When the optimum transmission/reception beam direction is to be learnt, the power calculation unit 183 calculates the received electrical power of the reception signal that is transmitted and received in each transmission/reception beam direction, and sequentially outputs it to the determination unit 184 (will be described later). Then, the determination unit 184 determines the optimum transmission beam direction or the optimum reception beam direction on the basis of the received power value input from the power calculation unit 183. Then, the parameter value for specifying the determined beam direction is stored in the storage unit 150 through the control unit 190. The optimum beam direction referred to herein typically corresponds to the beam direction in which a series of received power values input from the power calculation unit 183 with regard to one beam learning signal become a maximum value.

The demodulation and decoding unit 185 demodulates and decodes the reception signal weighted by the reception beam processing unit 182 in accordance with an arbitrary modulation scheme and an arbitrary coding scheme used in the millimeter-wave communication scheme, and obtains a data signal. Then, the demodulation and decoding unit 185 outputs the obtained data signal to the control unit 190.

The coding and modulation unit 186 codes and modulates the data signal input from the control unit 190 in accordance with an arbitrary coding scheme and an arbitrary modulation scheme used in the millimeter-wave communication scheme, and generates a transmission signal. Then, the coding and modulation unit 186 outputs the generated transmission signal to the transmission beam processing unit 187.

The transmission beam processing unit 187 generates a plurality of transmission signals that have been weighted in accordance with, for example, a uniform distribution or a Taylor distribution, from the transmission signal input from the coding and modulation unit 186, and controls the directivity of the transmission beam. The value of the weight used by the transmission beam processing unit 187 is specified by, for example, a beamforming signal input from the control unit 190. The plurality of transmission signals that have been weighted by the transmission beam processing unit 187 are each output to the DA conversion unit 176.

Referring back to FIG. 2, the description of the configuration of the wireless communication apparatus 100 will be continued. The control unit 190 is configured, for example, by using a computation device such as a microprocessor, and controls the overall operation of the wireless communication unit 170. Furthermore, the control unit 190 obtains a parameter value for identifying the optimum transmission beam direction or reception beam direction from the storage unit 150, and outputs, to the transmission beam processing unit 187 in the digital unit 180, a beamforming signal for instructing that a weight coefficient is provided to each of the antennas 160*a* to 160*n* so that a beam direction that is identified on the basis of the parameter value is formed. As a result, an optimum beam pattern such that the transmission beam or the reception beam at the time of wireless transmission in accordance with the millimeter-wave communication scheme by the wireless communication apparatus 100 is directed in the direction in which the communication party is positioned is formed.

The storage unit 150 is constituted by, for example, a writable recording medium, such as a semiconductor memory, and is used as a work memory into which a program for executing a communication process by the wireless communication apparatus 100 is loaded, or in which various parameter values are stored. Furthermore, the storage unit 150 is stored with parameter values for specifying the optimum transmission/reception beam direction at the time of wireless communication by the wireless communication unit 170 in accordance with the millimeter-wave communication scheme.

Figure 4:
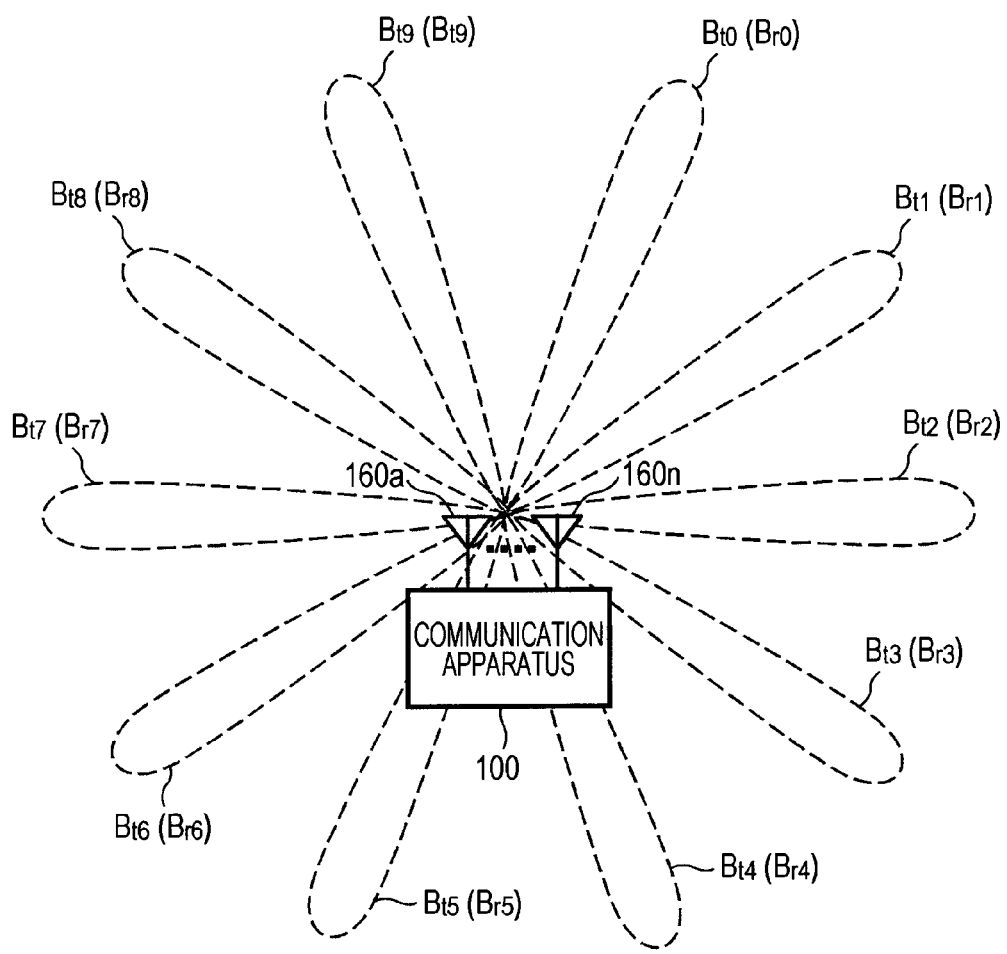
FIG. 4 illustrates an example of a transmission beam pattern that can be formed by the communication apparatus 100 through beamforming of a transmission beam by a transmission beam processing unit 185.

FIG. 4 illustrates an example of a transmission beam pattern that can be formed by the communication apparatus 100 through the directivity of a transmission beam being controlled by the transmission beam processing unit 185. In the example shown in the figure, it is possible for the communication apparatus 100 to form ten transmission beam patterns $B_{t0}$ to $B_{t9}$. The transmission beam patterns $B_{t0}$ to $B_{t9}$ have directivities in a direction that differ by 36 degrees in the plane in which the communication apparatus 100 is positioned.

The transmission beam processing unit 187 forms any one transmission beam pattern among such ten transmission beam patterns $B_{t0}$ to $B_{t9}$ by providing each of the antennas 160*a* to 160*n* with a weight coefficient in response to the beamforming signal from the control unit 190, making it possible to transmit a directional radio signal. Furthermore, the reception beam patterns that can be formed by the communication apparatus 100 may also be beam patterns similar to the transmission beams $B_{t0}$ to $B_{t9}$ shown in FIG. 4. That is, the reception beam processing unit 182 forms a reception beam pattern that matches any one (or combination of two or more) of such ten reception beam patterns $B_{r0}$ to $B_{r9}$ by providing a weight coefficient to each of the antennas 160*a* to 160*n* in response to the beamforming signal from the control unit 190, making it possible to cause a radio signal in accordance with the millimeter-wave communication scheme to be received by the antennas 160*a* to 160*n*. The storage unit 150 of the communication apparatus 100 is stored in advance with parameter values for identifying weight coefficients for each of the antennas 160*a* to 160*n* for forming these transmission/reception beam patterns $B_{t0}$ to $B_{t9}$ and $B_{r0}$ to $B_{r9}$, respectively.

Meanwhile, the transmission beam pattern and the reception beam pattern that can be formed by the communication apparatus 100 are not limited to the example shown in FIG. 4. For example, the plurality of antennas 160*a* to 160*n* can be configured so that a transmission beam pattern or a reception beam pattern having directivity in various directions in the three-dimensional space can be formed.

Figure 5:
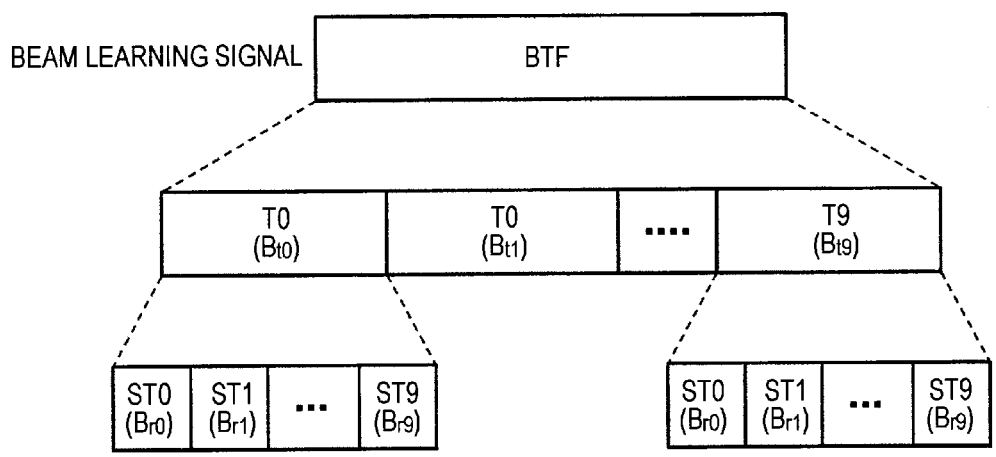
FIG. 5 illustrates an example of a signal format of a beam learning signal used for learning an optimum beam direction.

FIG. 5 illustrates an example of a signal format of a beam learning signal used for learning an optimum beam direction. However, in the figure, the description of the header part is omitted. A beam learning signal BTF (Beam Training Field) shown in the figure is transmitted in accordance with the millimeter-wave communication scheme from the plurality of antennas 160*a* to 160*n* possessed by a communication party. The learning signal sequence carried in the beam learning signal BTF may be, for example, a random pattern of BPSK (Binary Phase Shift Keying).

The beam learning signal shown in the figure is such that a learning signal sequence for each of the transmission beam patterns $B_{t0}$ to $B_{t9}$ is multiplexed on a time-division basis. The beam learning signal BTF is made up of ten time slots T0 to T9 corresponding to the transmission beam patterns $B_{t0}$ to $B_{t9}$ shown in FIG. 5, respectively. Then, in each of the time slots T0 to T9, ten kinds of learning signal sequences in which each of the antennas 160*a* to 160*n* has been weighted by a weight coefficient for forming each of the transmission beam patterns $B_{t0}$ to $B_{t9}$ with respect to a predetermined known signal sequence are sequentially transmitted. Therefore, the directivity of the transmission beam of the beam learning signal is sequentially changed as in the transmission beam patterns $B_{t0}$ to $B_{t9}$ shown in FIG. 5 for each of the time slots T0 to T9.

On the receiving side in which this beam learning signal BTF is received, the electrical power level of the reception signal for each of the time slots T0 to T9 (that is, for each learning signal sequence) of the beam learning signal BTF is sequentially observed. As a result, the electrical power level of the reception signal becomes a prominent value in one of the time slots of the beam learning signal BTF. The time slot in which the electrical power level of the reception signal becomes a peak changes in response to the position relative to the transmission side that transmits the beam learning signal BTF. Then, the transmission beam pattern corresponding to the time slot in which the received electrical power level becomes a peak can be determined to be the optimum transmission beam pattern for the transmission side.

Furthermore, it is assumed that the receiving side of the beam learning signal BTF can form ten reception beam patterns $B_{r0}$ to $B_{R9}$ identical to the transmission beam patterns $B_{t0}$ to $B_{t9}$ shown in FIG. 4. Then, each of the time slots T0 to T9 of the beam learning signal BTF is further divided into small sections ST0 to ST9 in units of 10, and the reception signal is weight-processed by ten kinds of different reception beam patterns $B_{r0}$ to $B_{r9}$ in each of the small sections ST0 to ST9. In the example shown in FIG. 5, the first small section ST0 of the time slot T0 is associated with a reception beam pattern $B_{r0}$, the second small section ST1 of the time slot T0 is associated with a reception beam pattern $S_{r1}$, . . . , the first small section ST0 of the time slot T9 is associated with a reception beam patterns $B_{r0}, \ldots$. With such a reception beam beamforming process, in one beam learning signal BTF, reception signals that are transmitted and received by ten kinds of transmission beam patterns x ten kinds of reception beam patterns=total of 100 transmission/reception beam patterns can be obtained.

The power calculation unit 183 shown in FIG. 3 calculates each of the received electrical powers of the reception signals that are transmitted and received by the above-mentioned total of 100 kinds of transmission/reception beam patterns, and sequentially outputs it to the determination unit 184. Then, on the basis of the input received power value, the determination unit 184 determines parameter values for identifying the optimum transmission beam pattern and reception beam pattern. The optimum beam pattern is typically a beam pattern in which a series of received power values input from the power calculation unit 183 with regard to one beam learning signal become a maximum value. The parameter value for identifying the optimum transmission beam pattern may be, for example, the time slot number (T0 to T9) of one of the beam learning signals BTF. Furthermore, the parameter value for identifying the optimum reception beam pattern may be, for example, a small section number (ST0 to ST9) shown in FIG. 5. The determination unit 184 outputs the parameter value that is determined in this manner to the control unit 190. Furthermore, the parameter value (T0 to T9) for identifying the optimum transmission beam pattern may be fed back to the transmission side of the beam learning signal BTF. However, this feedback procedure is not directly related to the gist of the present invention, and the description thereof is thus omitted in this specification.

The wireless communication system using millimeter waves can expand the communication range by using a plurality of transmission and reception antennas and by forming sharp antenna directivity (that is, beam-shaped antenna directivity). However, as has already been described in the section of Background Art, if control frames of RTS, CTS, and ACK other than a data frame are transmitted in an omni-directional manner when RTS/CTS handshake is used to avoid a collision resulting from a hidden terminal problem, there is a probability that a peripheral station that would not interfere a data frame in practice is made to unnecessarily set a transmission stop period. As a result, there is a concern that the number of communication stations that can be communicated with at the same time in the system is wastefully reduced, and the throughput of the entire system is decreased.

Figure 11:
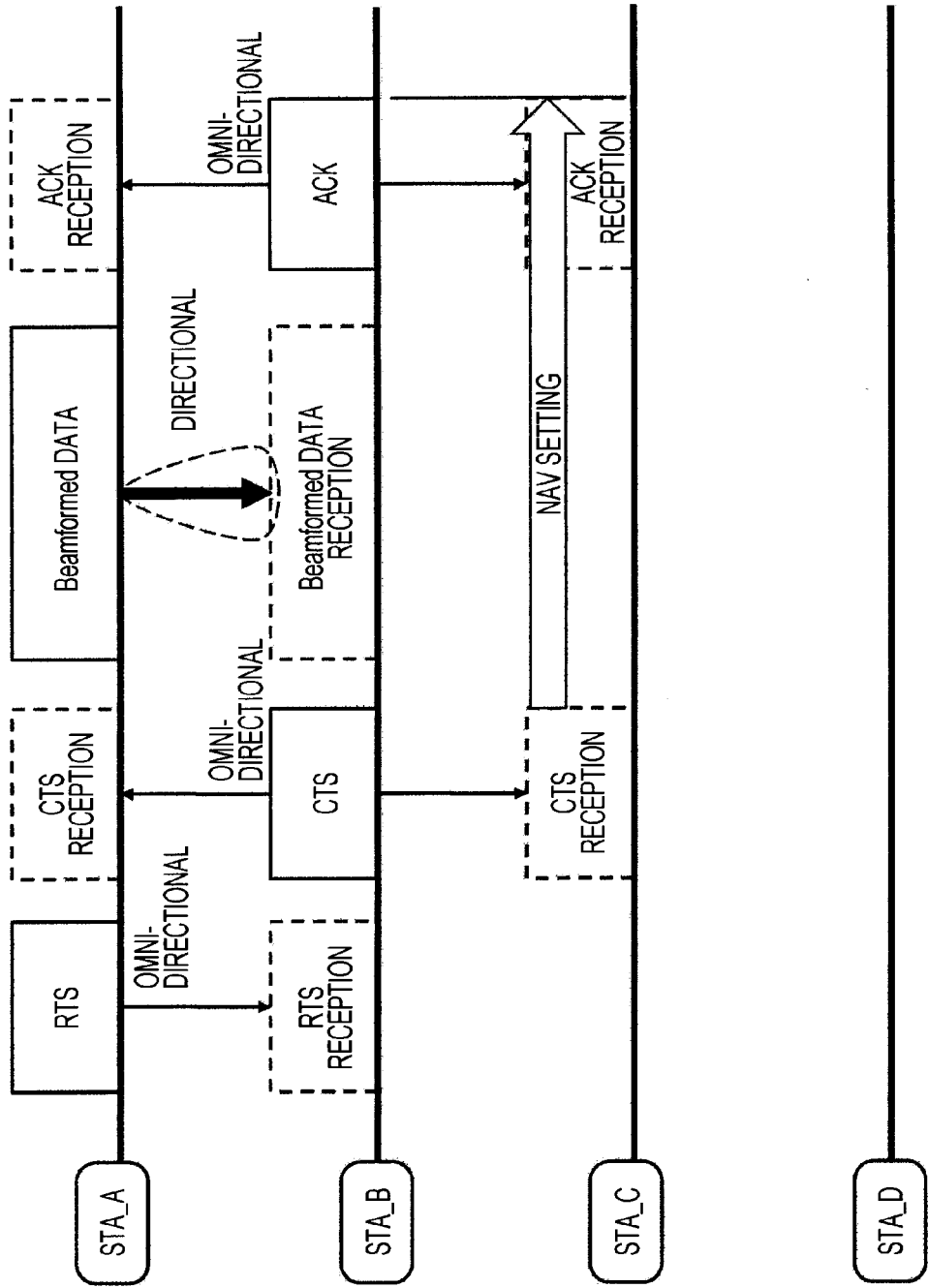
FIG. 11 illustrates an example of a signal transmission and reception sequence that is used with regard to only a data frame, in a case where control frames of RTS, CTS, and ACK are transmitted in an omni-directional manner.

In the example of the signal transmission and reception sequence shown in FIG. 11, when the data receiving side (STA_B) receives an RTS destined for its own station from the data transmission side (STA_A), the data receiving side (STA_B) transmits an omni-directional CTS, and causes a hidden terminal (STA_C) in a range in which the RTS does not reach but the CTS reaches to set a transmission stop period therein, thereby securing a period during which the data frame is received.

Figure 6:
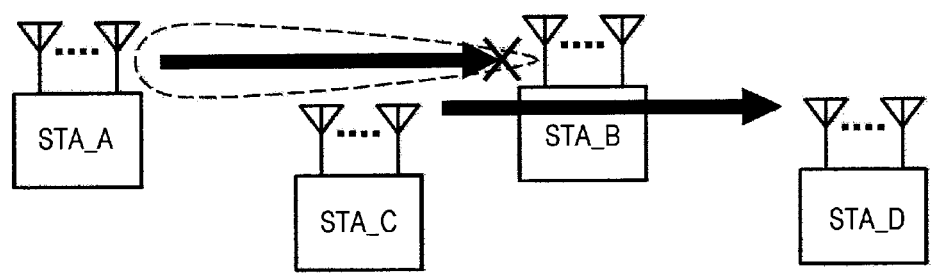
FIG. 6 illustrates a state in which a transmission/reception beam of a hidden terminal (STA_C) is in the same direction as that of the data transmission side (STA_A) with respect to a data receiving side (STA_B).

Here, as shown in FIG. 6, the hidden terminal (STA_C) performs the beamforming of the transmission/reception beam in a similar manner. In a case where the transmission/reception beam overlaps the reception beam in the same direction as that on the data transmission side (STA_A) with respect to the data receiving side (STA_B), that is, directed toward the data transmission side (STA_A) by the data receiving side (STA_B), unless the hidden terminal (STA_C) is made to set a transmission stop period, the data receiving side (STA_B) cannot receive a data frame from the data transmission side (STA_A).

Figure 7:
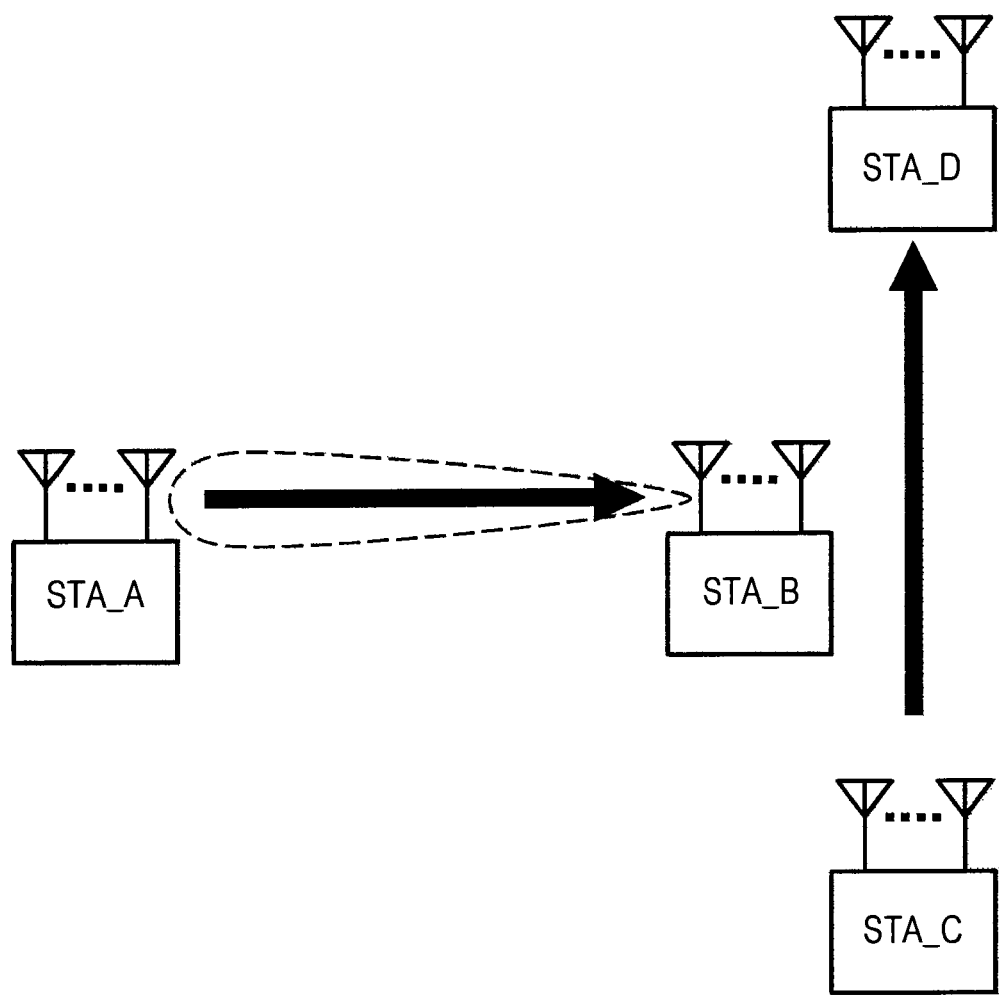
FIG. 7 illustrates a state in which the transmission/reception beam of the hidden terminal (STA_C) is in a direction different from that of the data transmission side (STA_A) with respect to the data receiving side (STA_B).
Figure 8:
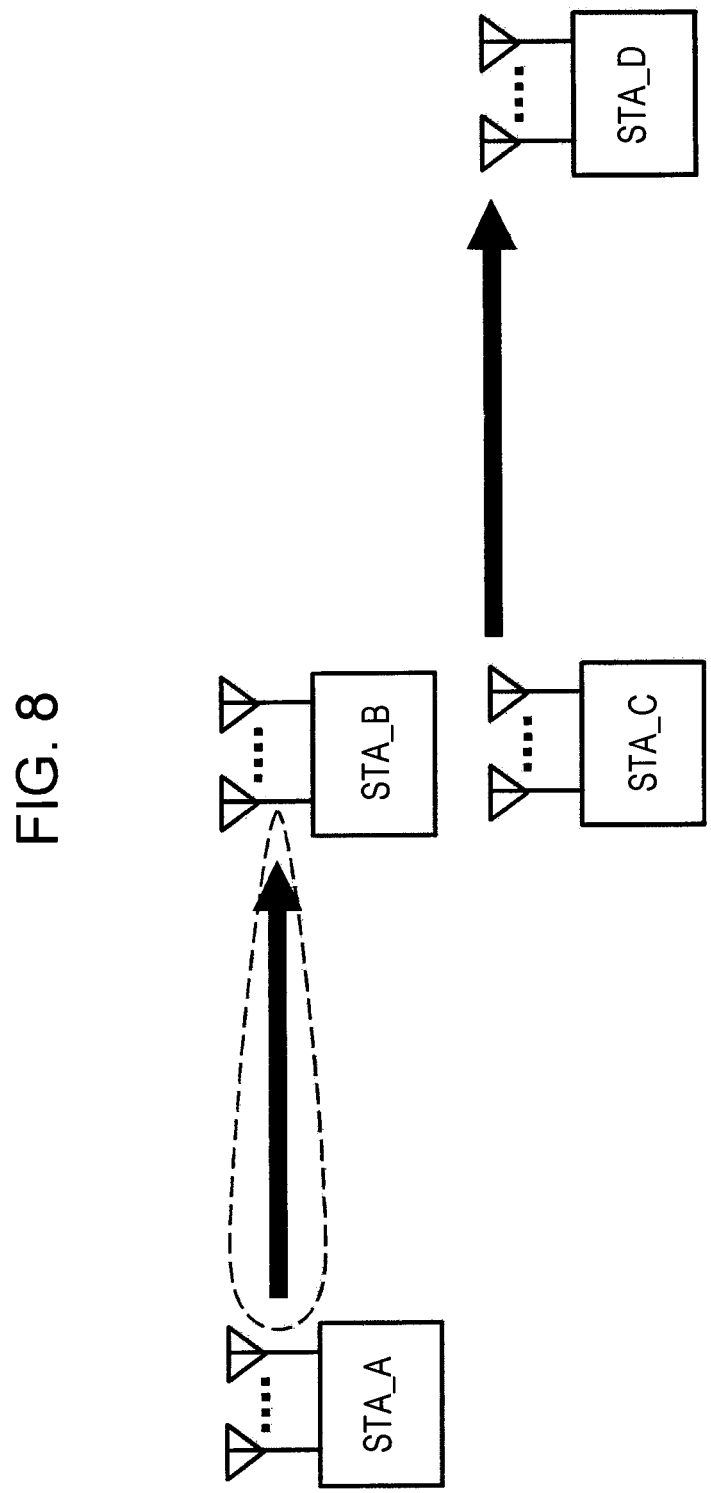
FIG. 8 illustrates a state in which the transmission/reception beam of the hidden terminal (STA_C) is in a direction different from that of the data transmission side (STA_A) with respect to the data receiving side (STA_B).

In comparison, as shown in FIGS. 7 and 8, in a case where the hidden terminal (STA_C) with respect to the data transmission side (STA_A) performs the beamforming of a transmission/reception beam in a similar manner, and the transmission/reception beam does not overlap the reception beam in a direction different from that on the data transmission side (STA_A) with respect to the data receiving side (STA_B), that is, directed toward the data transmission side (STA_A) by the data receiving side (STA_B), even if the hidden terminal (STA_C) does not set a transmission stop period and continues the operation of communicating with the communication party terminal (STA_D), the hidden terminal (STA_C) does not interfere with the operation of receiving a data frame from the data transmission side (STA_A) of the data receiving side (STA_B); rather, if the hidden terminal (STA_C) sets a transmission stop period, since it becomes an unnecessary transmission stop period, the throughput of the entire system is decreased.

Accordingly, in an embodiment of the present invention, in data transmission using RTS/CTS handshake, the beamforming of a transmission beam is performed not only on a data frame but also on a CTS frame. In such a case, in a case where the direction of a transmission/reception beam of the hidden terminal (STA_C) is different from the direction of the data transmission side (STA_A) with respect to the data receiving side (STA_B), that is, the transmission/reception beam does not overlap the reception beam directed toward the data transmission side (STA_A) by the data receiving side (STA_B), the hidden terminal (STA_C) ceases to receive the CTS. Consequently, the hidden terminal (STA_C) can continue the operation of communicating with the communication party terminal (STA_D) without setting the transmission stop period. As a result, in the system, the hidden terminal does not set an unnecessary transmission stop period, making it possible to increase the number of communication stations through which simultaneous communication is possible and increase the throughput of the entire system.

Figure 9:
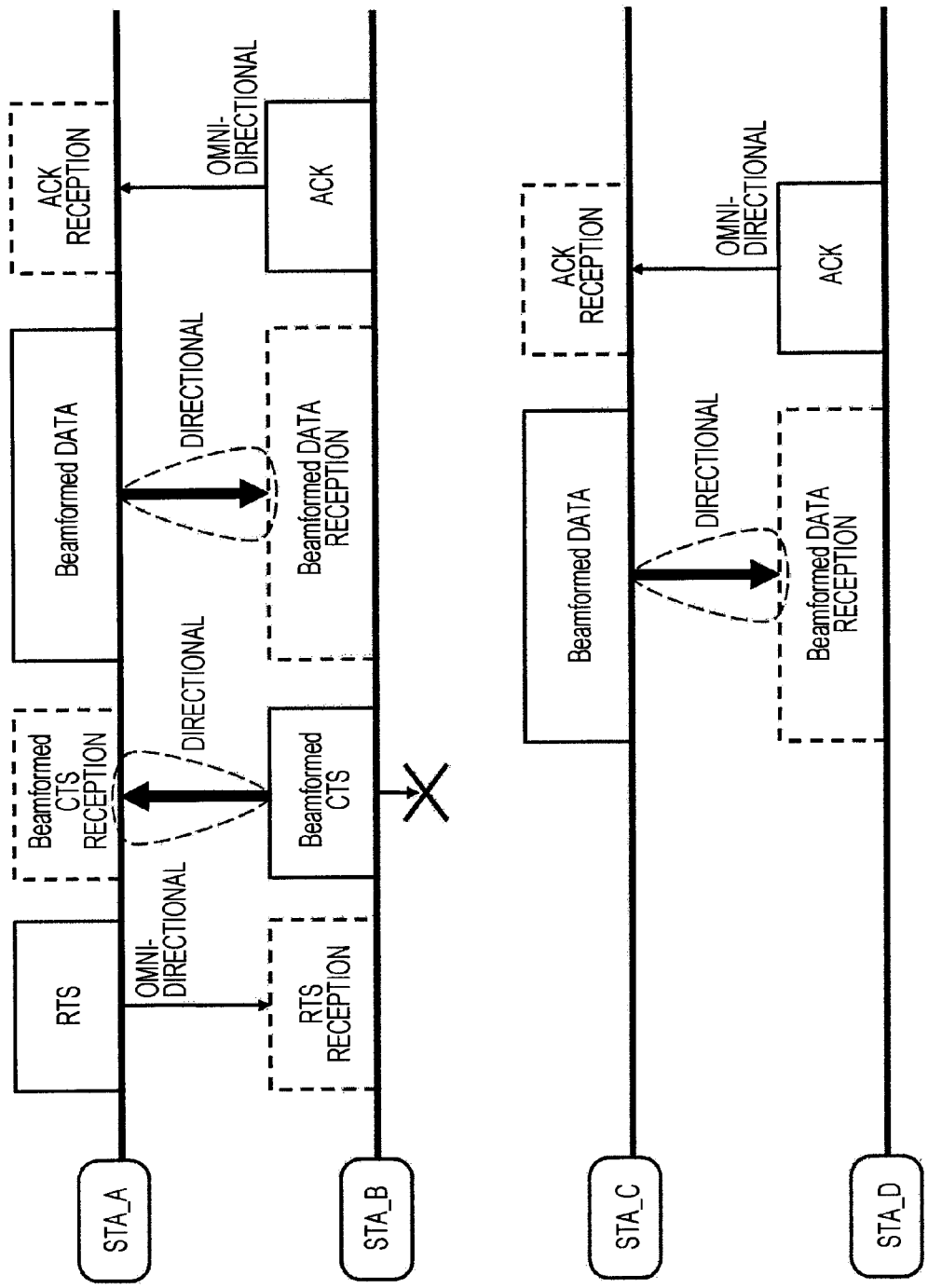
FIG. 9 illustrates a signal transmission and reception sequence using RTS/CTS handshake in a communication system according to an embodiment of the present invention.

FIG. 9 illustrates a signal transmission and reception sequence using RTS/CTS handshake in a communication system according to an embodiment of the present invention. However, it is assumed that each of the communication stations STA_A to STA_D is constituted by the communication apparatus 100 shown in FIGS. 2 to 4.

First, the data transmission side (STA_A) confirms that a medium is clear for only a fixed period through the procedure of CSMA, and thereafter transmits the RTS toward the data receiving side (CTS transmission side: STA_B) in an omni-directional manner.

When the data receiving side (STA_B) receives an RTS destined for its own station from the data transmission side (STA_A), the power calculation unit 183 calculates the received electrical power received with each of the plurality of beam patterns, and the subsequent determination unit 184 determines the beam pattern at which the received electrical power at the time of RTS reception becomes a maximum to be an optimum directional beam pattern.

Then, after a predetermined frame interval SIFS has passed, the data receiving side (STA_B), in response to the reception of the RTS, performs beamforming so as to be directed toward the position of the data transmission side (STA_A) by using the transmission beam pattern determined by the determination unit 184, and sends back a CTS (Beamformed CTS).

After the data transmission side (STA_A) transmits an RTS, the data transmission side (STA_A) waits for the reception of the CTS sent back from the data receiving side (STA_B). Then, when the data transmission side (STA_A)

confirms that the medium is clear by receiving the CTS, after the SIFS has passed since the CTS has been received, the data transmission side (STA_A) performs beamforming so that the transmission beam is directed toward the position of the data receiving side (STA_B), and transmits a data frame (Beamformed DATA).

After the data receiving side (STA_B) transmits the directional CTS, the data receiving side (STA_B) waits for the reception of the data frame from the data transmission side (STA_A). At that time, the data receiving side (STA_B) may use the reception beam pattern in the same direction as that of the optimum directional beam pattern used at the time of CTS transmission. Then, when the data receiving side (STA_B) safely receives the data frame, the data receiving side (STA_B) sends back an ACK in an omni-directional manner. As a result of receiving the ACK, the data transmission side (STA_A) recognizes that the series of RTS/CTS handshake procedures has been safely completed.

On the other hand, the transmission/reception beam of the hidden terminal (STA_C) is subjected to beamforming so as to be directed toward the position of the terminal (STA_D) that is a communication party. Here, the RTS that is transmitted from the data transmission side (STA_A) in an omni-directional manner does not reach the hidden terminal (STA_C). Furthermore, if the data receiving side (STA_B) transmits a CTS in an omni-directional manner, it arrives at the hidden terminal (STA_C). However, in the present embodiment, since the transmission/reception beam is subjected to beamforming so as to be directed toward the position of the data transmission side (STA_A), the hidden terminal (STA_C) does not receive the directional CTS.

Therefore, the hidden terminal (STA_C) does not set an unnecessary transmission stop period, and can transmit a data frame to a terminal (STA_D) that is a communication party in parallel with RTS/CTS handshaking between the data transmission side (STA_A) and the data receiving side (STA_B). As a result, in the system, the number of communication stations through which simultaneous communication is possible can be increased, and the throughput of the entire system can be increased.

Figure 10:
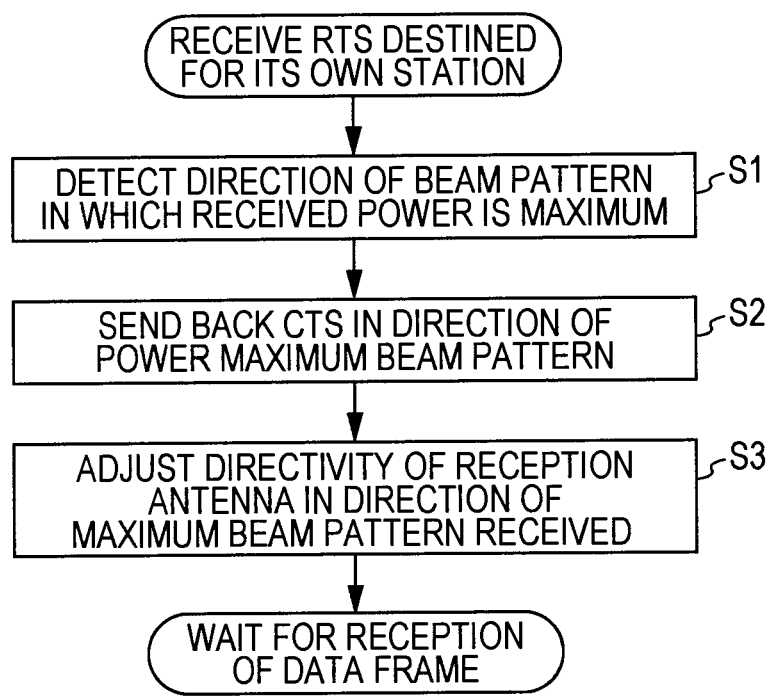
FIG. 10 is a flowchart illustrating a processing procedure for performing a communication operation as the data receiving side (STA_B) in the signal transmission and reception sequence shown in FIG. 9.

FIG. 10 illustrates, in the form of a flowchart, a processing procedure in which the communication apparatus 100 performs a communication operation as the data receiving side (STA_B) in the signal transmission and reception sequence shown in FIG. 9. This processing procedure is realized, for example, by executing a predetermined control program by the control unit 190.

This processing procedure starts up in response to the data receiving side (STA_B) receiving an RTS destined for its own station.

While the data receiving side (STA_B) is receiving an RTS destined for its own station, the power calculation unit 183 measures the electrical power of the received signal while the reception beam pattern is changed, for example, by 360 degrees for each predetermined angle. Then, when the determination unit 184 detects the direction of the reception beam pattern in which the received electrical power becomes a maximum, the determination unit 184 stores, in the storage unit 150, this direction as an optimum directional beam pattern for the data transmission side (STA_A) (step S1).

Next, the data receiving side (STA_B) adjusts the transmission antenna so that the optimum directional beam pattern is formed, and sends back a directional CTS (Beamformed CTS) to the data transmission side (STA_A) (step S2).

Next, the data receiving side (STA_B) adjusts the reception antenna so that the optimum directional beam pattern is formed (step S3), and waits for a data frame from the data transmission side (STA_A).

Meanwhile, the communication apparatus 100 that operates as an access point (AP) or a terminal station (STA) may be, for example, a portable information terminal, such as a personal computer (PC), a mobile phone, or a PDA (Personal Digital Assistant), an information device, such as a portable music player or a game machine, or a wireless communication module installed in a television receiver or other home information appliances.

FIG. 12 illustrates an example of the configuration of an information apparatus having the modularized communication apparatus 100 installed therein.

A CPU (Central Processing Unit) 1 executes a program stored in a ROM (Read Only Memory) 2 or a hard disk drive (HDD) 11 under a program execution environment provided by the operating system (OS). For example, a reception frame synchronization process (to be described later) or partial processing thereof can be realized in such a form that the CPU 1 executes a predetermined program.

The ROM 2 has stored permanently therein program codes of POST (Power On Self Test), BIOS (Basic Input Output System), and the like. A RAM (Random Access Memory) 3 is used to load thereinto a program stored in the ROM2 and the HDD (Hard Disk Drive) 11 when the CPU 1 executes the program, or is used to temporarily hold operation data of the program being executed. These are interconnected with one another through a local bus 4 that is directly connected to the local pin of the CPU 1.

The local bus 4 is connected to an input/output bus 6, such as a PCI (Peripheral Component Interconnect) bus, through a bridge 5.

A keyboard 8, and a pointing device 9 such as a mouse are input devices that are operated by a user. A display 10, which is made up of an LCD (Liquid Crystal Display) or a CRT (Cathode Ray Tube), displays various information in the form of text and images.

The HDD 11 is a drive unit having incorporated therein a hard disk as a recording medium, and drives the hard disk. The hard disk is used to install programs, such as the operating system and various applications, which are executed by the CPU 1, and is used to store data files and the like.

A communication unit 12 is a wireless communication interface that is formed by modularizing the wireless communication apparatus 100, operates as an access point or as a terminal station in the infrastructure mode, or operates in the adhoc mode, and performs communication with other communication terminals that exist in the communication range. The operation of the wireless communication apparatus 100 has already been described.

Industrial Applicability

In the foregoing, the present invention has been described in detail while referring to specific embodiments. However, it is obvious that a person skilled in the art can make modifications and substitutions of the embodiments within the scope and spirit of the present invention.

In this specification, a description has been mainly given of an embodiment in which the millimeter-wave communication scheme uses a 60 GHz band used in IEEE 802.15.3c. However, the gist of the present invention is not necessarily limited to a specific frequency band. Furthermore, not limited to millimeter-wave communication, other directional communications may be used.

In summary, the present invention has been disclosed in the form of examples, and the described content of the present specification should not be construed as being limiting. In order to determine the gist of the present invention, reference should be made to the claims.

REFERENCE NUMERALS

1 ... CPU
2 ... ROM
3 ... RAM
4 ... local bus
5 ... bridge
6 ... input/output bus
7 ... input/output interface
8 ... keyboard
9 ... pointing device (mouse)
10 ... display
11 ... HDD
12 ... communication unit
100 ... communication apparatus
150 ... storage unit
160a to 160n ... plural antennas
170 ... wireless communication unit
172 ... analog unit
174 ... AD conversion unit
176 ... DA conversion unit
180 ... digital unit
181 ... synchronization unit
182 ... reception beam processing unit
183 ... power calculation unit
184 ... determination unit
185 ... demodulation and decoding unit
186 ... coding and modulation unit
187 ... transmission beam processing unit
190 ... control unit

The invention claimed is:

1. A communication apparatus comprising:
a wireless communication unit configured to:
transmit an omni-directional request to send wireless message to a communication party, wherein the omni-directional request to send wireless message comprises a plurality of beam patterns;
receive a directional clear to send wireless message from the communication party; and
a determination unit configured to determine a directional beam pattern to be used when a data frame is transmitted to the communication party,
wherein the directional beam pattern is determined based on the received directional clear to send wireless message, wherein the directional beam pattern of the received directional clear to send wireless message is determined based on a power level of a reception signal corresponding to each of the plurality of the beam patterns, and
wherein beamforming is performed on the directional clear to send wireless message to prevent an unnecessary stop period for a hidden terminal.

2. The communication apparatus according to claim 1, wherein an acknowledgement frame is sent back to the communication party by using the directional beam pattern that is determined by the determination unit in response to the reception of a transmission start request frame, wherein after the acknowledgement frame is sent back, a data frame is received from the communication party using a reception beam pattern in the same direction as that of the directional beam pattern used when the acknowledgement frame was sent back.

3. The communication apparatus of claim 1, wherein:
the wireless communication unit is configured to perform wireless communication in accordance with a communication scheme that has a plurality of beam patterns of different directions and that uses a predetermined high-frequency band; and
the determination unit is configured to determine the directional beam pattern to be used from among the plurality of beam patterns.

4. The communication apparatus of claim 3, wherein an acknowledgement frame is sent back to the communication party by using the directional beam pattern that is determined by the determination unit in response to the reception of a transmission start request frame from the communication party.

5. The communication apparatus of claim 1, wherein:
the omni-directional request to send wireless message is an omni-directional RTS message in compliance with IEEE 802.xx specifications; and
the directional clear to send wireless message is a directional CTS message incompliance with IEEE 802.xx specification.

6. The communication apparatus according to claim 1, wherein the wireless communication unit is configured to perform wireless communication in accordance with a communication scheme that has a plurality of beam patterns of different directions and that uses a predetermined high-frequency band, and
the determination unit is configured to determine the directional beam pattern to be used when a frame is transmitted to the communication party from among the plurality of beam patterns,
wherein the communication apparatus further comprises a power calculation unit that calculates received electrical power when a frame that arrives from the communication party is received with each of the plurality of beam patterns,
wherein the determination unit determines the directional beam pattern on the basis of a beam pattern at which received electrical power of a transmission start request frame received from the communication party becomes a maximum.

7. A communication method comprising:
transmitting an omni-directional request to send wireless message to a communication party, wherein the omni-directional request to send wireless message comprises a plurality of beam patterns;
receiving a directional clear to send wireless message from the communication party; and
determining a directional beam pattern to be used when a data frame is transmitted to the communication party, wherein the directional beam pattern is determined based on the received directional clear to send wireless message,
wherein the directional beam pattern of the received directional clear to send wireless message is determined based on a power level of a reception signal corresponding to each of the plurality of the beam patterns,
wherein the directional beam pattern is utilized in transmitting the directional clear to send wireless message to prevent an unnecessary stop period for a hidden terminal.

8. The communication method of claim 7, wherein said transmitting an omni-directional request to send wireless message is performed by a wireless communication unit.

9. The communication method of claim 8, wherein the wireless communication unit is configured to perform omni-directional and directional wireless communication in accordance with a communication scheme that has a plurality of beam patterns of different directions and that uses a predetermined high-frequency band.

10. The communication method of claim 9, further comprising determining the directional beam pattern to be used when a data frame is transmitted to a communication party from among the plurality of beam patterns.

11. The communication method of claim 10, further comprising sending back an acknowledgement frame to the communication party by using the determined directional beam pattern in response to a reception of a transmission start request frame from the communication party.

12. The communication method of claim 7, wherein:
the omni-directional request to send wireless message is an omni-directional RTS message in compliance with IEEE 802.xx specifications; and
the directional clear to send wireless message is a directional CTS message incompliance with IEEE 802.xx specification.

13. A non-transitory computer-readable storage medium having stored thereon, a computer program having at least one code section for processing, the at least one code section being executable by a computer for causing the computer to perform steps comprising :
in a communication apparatus:
transmitting an omni-directional request to send wireless message to a communication party, wherein the omni-directional request to send wireless message comprises a plurality of beam patterns;
receiving a directional clear to send wireless message from the communication party; and
determining a directional beam pattern to be used when a data frame is transmitted to the communication party, wherein the directional beam pattern is determined based on the received directional clear to send wireless message,
wherein the directional beam pattern of the received directional clear to send wireless message is determined based on a power level of a reception signal corresponding to each of the plurality of the beam patterns,
wherein beamforming is performed on the directional clear to send wireless message to prevent an unnecessary stop period for a hidden terminal.

14. The non-transitory computer-readable storage medium of claim 13, further causing the computer to perform the steps comprising:
perform wireless communication in accordance with a communication scheme that has a plurality of beam patterns of different directions and that uses a predetermined high-frequency band; and
determine a directional beam pattern to be used when a frame is transmitted to the communication party from among the plurality of beam patterns.

15. The non-transitory computer-readable storage medium of claim 14, wherein an acknowledgement frame is sent back to the communication party by using the determined directional beam pattern in response to the reception of a transmission start request frame from the communication party.

16. The non-transitory computer-readable storage medium of claim 13, wherein:
the omni-directional request to send wireless message is an omni-directional RTS message in compliance with IEEE 802.xx specifications; and
the directional clear to send wireless message is a directional CTS message incompliance with IEEE 802.xx specification.

17. A communication system comprising:
a communication apparatus comprising:
a wireless communication unit configured to:
transmit an omni-directional request to send wireless message to a communication party, wherein the omni-directional request to send message comprises a plurality of beam patterns; and
receive a directional clear to send wireless message from the communication party; and
a determination unit configured to determine a directional beam pattern to be used when a data frame is transmitted to the communication party, wherein the directional beam pattern is determined based on the received directional clear to send wireless message, wherein the directional beam pattern of the received directional clear to send wireless message is determined based on a power level of a reception signal corresponding to each of the plurality of the beam patterns, and
wherein beamforming is performed on the directional clear to send wireless message to prevent an unnecessary stop period for a hidden terminal.

18. The communication system of claim 17, wherein the communication system operates in accordance with a communication scheme using a predetermined high-frequency band, wherein the communication apparatus transmits a transmission start request frame to a data receiving side different from the communicating party, and performs beamforming to transmit the data frame so that a transmission beam is directed toward the data receiving side in response to a reception of an acknowledgement frame sent back from the data receiving side.

19. The communication system of claim 18, wherein the communication system is configured to:
perform directional wireless communication in accordance with a communication scheme using the predetermined high-frequency band;
perform beamforming so that a transmission beam is directed toward the communication apparatus in response to a reception of the transmission start request frame from the communication apparatus so as to send back the acknowledgement frame; and
receive the data frame from the communication apparatus.

20. The communication system of claim 17, wherein:
the omni-directional request to send wireless message is an omni-directional RTS message in compliance with IEEE 802.xx specifications; and
the directional clear to send wireless message is a directional CTS message incompliance with IEEE 802.xx specification.

* * * * *